United States Patent [19]
Cousin

[11] 3,850,484
[45] Nov. 26, 1974

[54] SLIDE-GUIDE FOR MOTOR CAR SEATS
[75] Inventor: Maurice Claude Cousin, Flers, France
[73] Assignee: A&M Cousin et Cie. Etablissements Cousin Freres, LeBois de Flers, Flers, Orne, France
[22] Filed: Mar. 1, 1973
[21] Appl. No.: 337,121

[30] Foreign Application Priority Data
Mar. 6, 1972 France .............................. 72.07741

[52] U.S. Cl. ..................... 308/6 R, 308/3.8, 74/533
[51] Int. Cl. ............................................ F16c 17/00
[58] Field of Search ....... 308/6 R, 3.8; 74/533, 529, 74/534; 312/342

[56] References Cited
UNITED STATES PATENTS
2,725,092  11/1955  Cartwright ........................ 308/6 R
3,001,835  9/1961   Kramer .............................. 308/6 R
3,013,763  12/1961  Weberman .......................... 308/6 R
3,450,425  6/1969   Leonhardt ............................ 74/533
3,685,872  8/1972   Babbs ................................. 308/6 R Primary Examiner—Charles J. Myhre
Assistant Examiner—R. H. Lazarus

[57] ABSTRACT

The slide-guide for a seat comprising a channel-shape guide having outwardly extending borders. The upper surface of the borders form guide bearing races for roller bearings positioned between the guide and a slide located above the guide. The slide has folded under sides spaced from the borders and encompasses portions of the borders within their folds.

6 Claims, 10 Drawing Figures

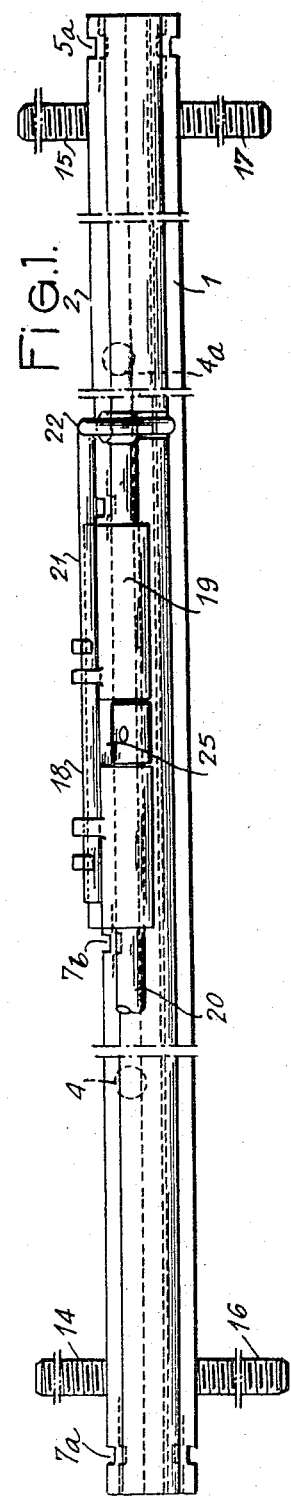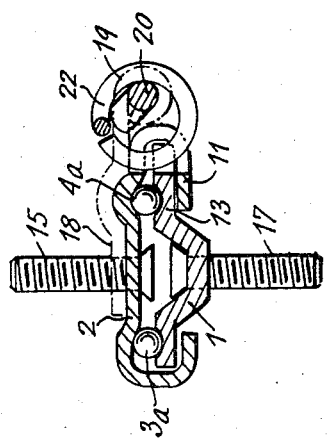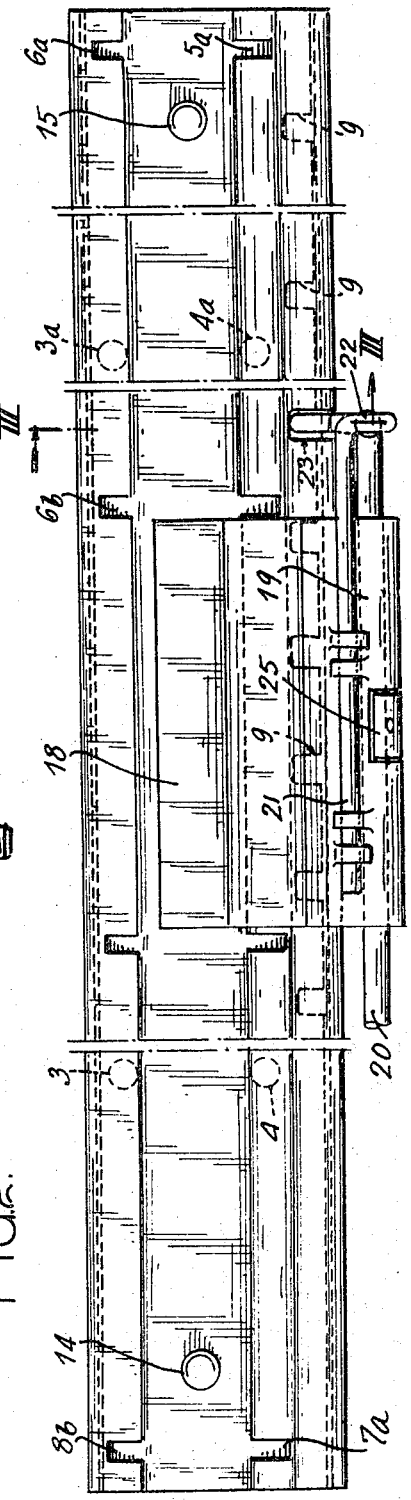

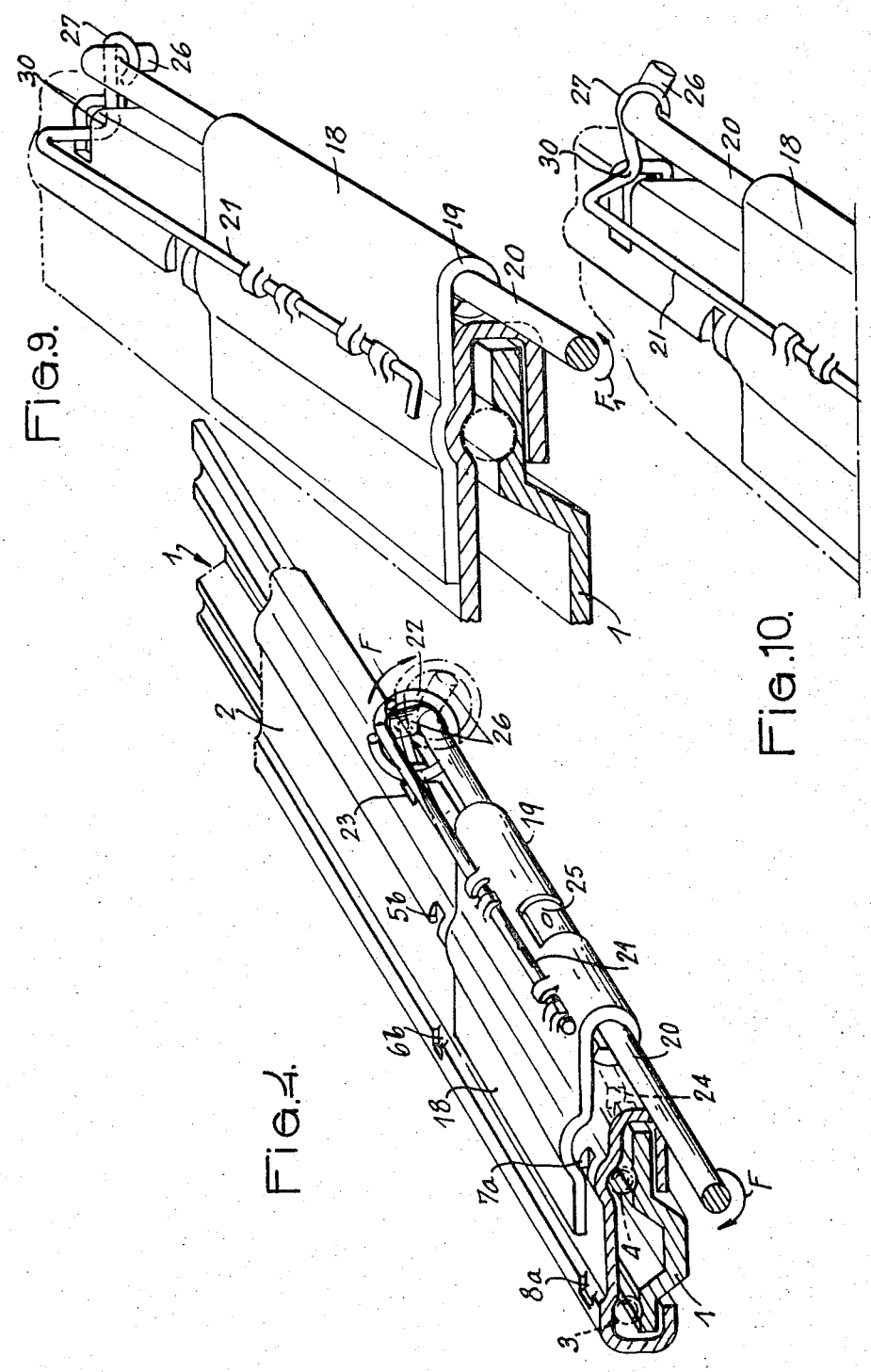

SLIDE-GUIDE FOR MOTOR CAR SEATS

The present invention relates to slide-guides for seats of motor cars.

For a long time it is known to place seats of motor cars on slide-guides in order that the driver and also the passengers may adapt the position of the seats to their own size. Up to now, said slide-guides were not designed provided to be subjected to large strains. But research performed to increase the safety of passengers in the motor cars in case of accident have shown that fixing the safety belts on the car body does not provide the anticipated results. It has then been decided—according to the new safety regulations—to fix these safety belts to the seat itself. Then it is necessary that the slide-guides be able to resist the large loads to which they are submitted in a shock if an accident occurs.

For this reason, the present invention has for its object to provide a new slide-guide capable of resisting such large loads while being simple to construct and of a relatively low cost.

According to the invention, the slide-guide comprises a guide provided with ribs and made of thick metal, the border of the guide being provided with a ball-race for balls, the slide-guide further comprising a slide, having folded sides. Guiding of the slide-guide is ensured by the balls located in the ball-race and by the folded sides encompassing the borders of the guide. Travel of the balls is restricted by semi-cuts, or depressions, made on the slide of the slide-guide either at each end or in the central zone thus forming obstructions confining the balls while still permitting the desired travel of the slide. Desired placing is obtained by ratcheting a resilient rod comprising a portion being housed into notches made into the guide, and held by an apertured part made in the slide of the slide-guide.

Embodiments of the slide-guide according to present invention are shown by way of non-restrictive examples in the accompanying drawings, in which:

FIG. 1 is a lateral view of a slide-guide according to the invention.

FIG. 2 is a plane view of the slide-guide of FIG. 1.

FIG. 3 is a sectional view taken along line III—III of FIG. 2.

FIG. 4 is a perspective enlarged view showing the ratchet device.

FIG. 9 is a perspective view of another variant of the ratchet device when not operated.

FIG. 10 is a partial perspective view of FIG. 9 showing the ratchet device in the released position.

Figure 5:
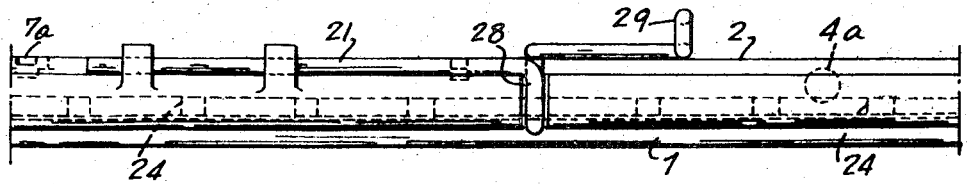
FIG. 5 is a lateral view of a variant of the ratchet device.

The slide-guide for motor car seats shown in the drawings is composed of two sections, the lower section, or guide, 1 having a V-shape and the slide, 2 having folded sides. The guide 1 is made of a metal having a thickness bigger than that of the slide 2. The borders of the guide 1 are provided with ball-races for balls 3, 4 and 3a, 4a, the travel of the same being restricted by semi-cuts, or depressions, 8b, 7a; 8a, 7b, 6b, 5b; 6a, 5a forming obstructions in the slide 2, either at each end or in the central zone of this section, but in such a way that it be possible always to obtain a travel corresponding to the designed notch 24 provided on one of the borders of the guide 1.

By means of the balls 3, 4; 3a, 4a and the slide sides 10, 11 of the slide 2 folded around the borders, 12, 13 of the guide 1, a perfect guiding is obtained of the slide of the slide-guide connected to the seat by bolts 14, 15, on the guide of the slide-guide fixed on the floor of the vehicle by bolts 16 and 17.

The ratchet device, according to the embodiment shown in FIGS. 1–4, is a small rectangular metal plate 18 having one edge which is folded back to form a guiding tube 19 for a round rod 20. Said plate 18 partially corresponds to the shape of the slide 2 of the slide-guide and is fixed on the slide by any appropriate means so that the tubular portion 19 is parallel to the edge of the slide-guide. A resilient rod 21, preferably made of spring steel, is fixed through setting on the top of the tubular portion 19 of the small plate 18 and is engaged with its ring shaped end 22 by passing through an aperture 23 provided into the slide 2, in one of the notches 24 of the guide 1. Thus, the slide 2 is blocked with respect to the guide. When it is desired to move the seat connected to the slide 2 of the slide-guide, the rod 20 is turned. Rod 20 is guided in the tubular portion 19 and prevented from moving axially by an added part (shown but not numbered in FIGS. 1 and 2) moving within an aperture 25 of the tube 19. Thus the rotation of the rod 20, in the direction of arrow F, also moves its bent end 26 which is within the annular end portion 22 of the resilient rod 21. While swivelling, the bent end 26 then operates the ring 22 like an eccentric and releases it from notch 24 of the guide 1, thus releasing the slide 2 of the slide-guide connected to the seat of the vehicle. As soon as the rod 20 is released, resiliency of the spring rod 21 brings back the ring 22 and consequently brings backs through the bent end 26 the rod 20 into its initial position, and the ring 22 can, when being in front, be engaged in one of the notches 24 of the guide 1.

A first variant of the ratchet device shown in FIGS. 9 and 10 provides for moving the fixing of the resilient rod 21 towards center of the plate 18 in order that its bent end provided with an eyelet-hole 27 engages, when not operating, with its bend part into one of the notches 24 of the guide 1. The bent portion 26 passing through the eyelet-hole 27 thus enables—by rotation of the rod 20 according to the arrow $F_1$— to obtain the release of the slide 2 of the slide-guide as shown in FIG. 10.

Figure 7:
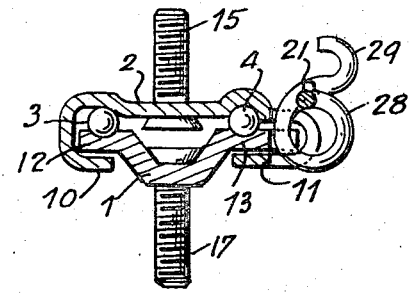
FIG. 7 is a sectional view taken along line VII—VII of FIG. 6.
Figure 6:
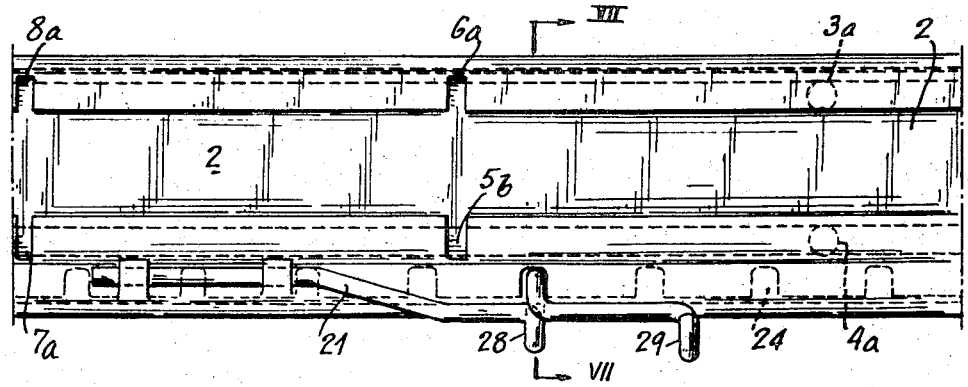
FIG. 6 is a plane view of FIG. 5.
Figure 8:
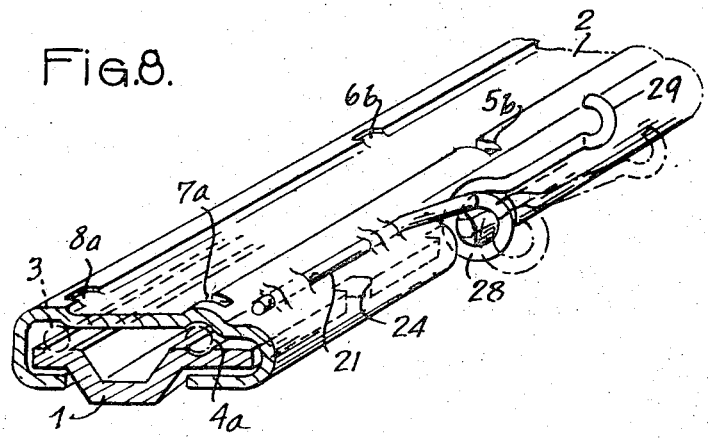
FIG. 8 is a perspective enlarged view of the ratchet device shown in FIGS. 5 to 7.

The second variant of the ratchet device shown in FIGS. 5–8 relates to a simplified realization not requiring the added plate 18, the resilient rod 21 is then directly fixed on the upper tubular section 2. Thus is formed, at half-length of the resilient rod 21, a ring 28 and, on the end opposite to its fixing, a catching hook 29. When not operated the ring 28 is then ratched into one of the notches 24 holding the seat into place. To move the slide 2 of the slide-guide and, consequently, also the seat, the catching hook 29 is pulled to withdraw the ring 28 out of the notch 24. This position is shown in broken line FIG. 8.

These embodiments of a slide-guide for a seat of motor cars are of a simple design easy to made and have an increased strength due to the ribs provided on the guide and to the tubular section of the slide. Thus such a slide-guide complies with the safety regulations determined for car manufacturing.

This present invention is not restricted to the embodiments shown and described in detail since various modifications thereof can moreover be applied to it without departing from the scope of the invention as shown by the appendant claims.

I claim:

1. A slide-guide for a seat comprising:
   a rigid elongated guide with a channel-shaped cross-section having: a flat central portion, upwardly extending side walls, and borders extending outwardly from said side walls, the upper surface of said borders forming guide bearing races;
   an elongated slide having a central web spaced apart from said flat central portion of said guide, and having folded-under sides spaced from said borders and encompassing portions of said borders within their folds, the under surface of said slide facing said guide bearing races forming slide bearing races; and
   rolling bearings positioned in said races between said guide and said slide, whereby said bearings permit guided movement of said slide relative to said guide without contact between said slide and said guide.

2. The slide-guide as claimed in claim 1, wherein said rolling bearings comprise ball bearings; and including obstructions positioned in said slide bearing races to confine the travel of the bearings without restricting the travel of said slide.

3. The slide-guide as claimed in claim 1, wherein one of said borders has notches spaced along its length, and said slide includes an aperture in one of said folded sides capable of being aligned with one of said notches; said slide-guide further including a resilient rod coupled to said slide and having an engaging portion positioned in said aperture for releasable engagement with the sides of said notch, whereby movement between said slide and said guide is prevented.

4. The slide-guide as claimed in claim 3, including: a plate carried on said slide and coupling said resilient rod to said slide; and a handling rod rotatably coupled to said plate, said handling rod having a bent end positioned within a ring formed adjacent said engaging portion of said resilient rod, whereby rotation of said handling rod moves said engaging portion out of said slot and allows movement of said slide.

5. The slide-guide as claimed in claim 3, wherein one end of said resilient rod is coupled to said slide, said engaging portion is located between the ends of said resilient rod, and the other end of said resilient rod includes a catching hook for moving said engagement portion out of engagement with the sides of said slot.

6. A slide-guide for a seat comprising:
   a rigid elongated guide with a channel-shaped cross-section having: a flat central portion, upwardly and outwardly extending side walls, and borders extending outwardly from said side walls and parallel to said flat central portion, the upper surface of said borders forming guide bearing races, one of said borders having notches spaced along its length;
   an elongated slide having a central web parallel to and spaced apart from said flat central portion of said guide, and having folded-under sides spaced from said borders and encompassing portions of said borders within their folds, the under surface of said slide facing said guide bearing races forming slide bearing races, said slide having an aperture in one of said folded sides capable of being aligned with one of said notches;
   ball bearings positioned in said races between said guide and said slide, said bearings permitting guided movement of said slide relative to said guide without contact between said slide and said guide; and
   a resilient rod coupled to said slide and having an engaging portion positioned in said aperture for releasable engagement with the sides of said notch, whereby movement between said slide and said guide is prevented.

* * * * *